United States Patent [19]
Shelton

[11] Patent Number: 5,164,749

[45] Date of Patent: Nov. 17, 1992

[54] CLIP FOR MOUNTING SUNGLASS LENSES ON SPECTACLES

[75] Inventor: Robert Shelton, Princeton, Mass.

[73] Assignee: Opsales/Lenservice, Inc., Island Park, N.Y.

[21] Appl. No.: 625,077

[22] Filed: Dec. 10, 1990

[51] Int. Cl.⁵ .............................................. G02C 9/04
[52] U.S. Cl. ......................................... 351/47; 351/57
[58] Field of Search ........................ 351/44, 47, 57, 59

[56] References Cited

U.S. PATENT DOCUMENTS

| | | | |
|---|---|---|---|
| 3,575,497 | 4/1971 | LeBlanc | 351/47 |
| 3,876,295 | 4/1975 | Loughner | 351/47 |
| 4,163,607 | 8/1979 | Nannini | 351/57 |
| 5,100,224 | 3/1992 | Terrasi | 351/57 |

Primary Examiner—Paul M. Dzierzynski
Attorney, Agent, or Firm—James & Franklin

[57] ABSTRACT

The clip includes a lens carrying member and a spectacle clamping member which are situated on opposite sides of a bifurcated support member. A single simple "c" shaped spring retains the members together, urges the clamping member toward its spectacle clamping position and urges the lens carrying member toward either an operative position, where the sunglass lenses intersect the line of sight, or an inoperative position, where the sunglass lens are remote from the line of sight.

20 Claims, 5 Drawing Sheets

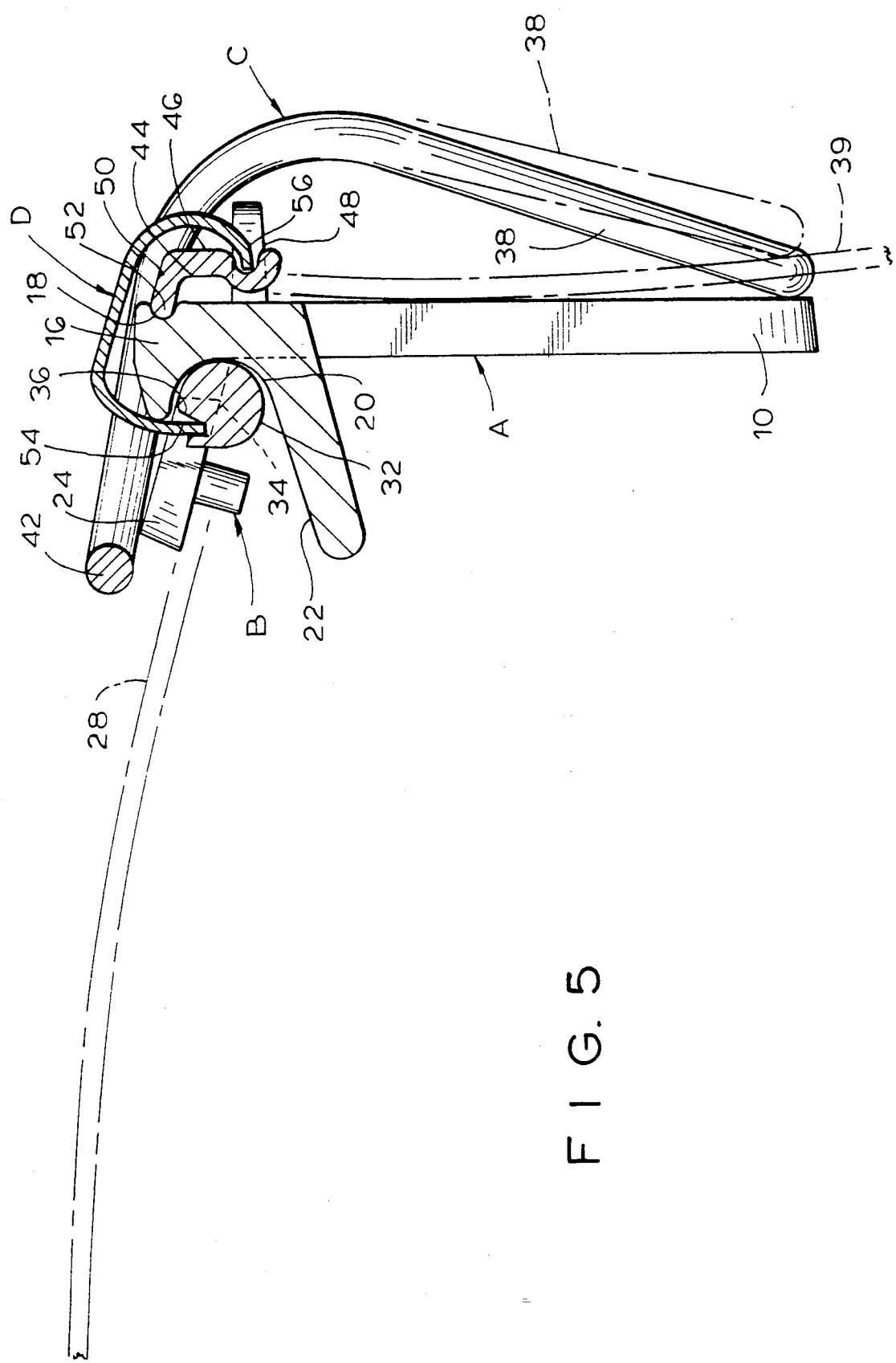

CLIP FOR MOUNTING SUNGLASS LENSES ON SPECTACLES

The present invention relates to a device for removably mounting sunglass lenses on spectacles and more particularly to a clip for mounting sunglass lenses on spectacles which includes a single simple "c" shaped spring which retains the parts together and, at the same time, provides the force to clamp the spectacles and urges the sunglass lens into either the operative or inoperative position.

U.S. Pat. No. 3,575,497 issued Apr. 20, 1971 to Conrad Leblanc entitled "Auxiliary Eye Protection Assembly" describes a commercially successful configuration for sunglass lenses adapted to removably clip onto spectacles in a manner which permits the lenses to be moved between one of two stable positions, an operative position, wherein the lenses intersect the line of sight (parallel to and in front of the spectacle lenses) and an inoperative position, wherein the lenses are remote from the line of sight (perpendicular to and above the spectacle lenses). The present invention is a device which, like the assembly of the aforementioned patent, is designed to removably mount onto spectacles without the necessity of removing the spectacles from the head and, in addition, is capable of being moved relative to the spectacles between operative and inoperative positions. However, the clip of the present invention consists of parts of simpler construction which are more easily assembled, forming a more releasable, less expensive device as compared to the assembly of the aforementioned patent.

It is, therefore, a prime object of the present invention to provide a clip for mounting sunglass lenses on spectacles which consists of parts of simple inexpensive construction which can be easily assembled.

It is another object of the present invention to provide a clip for mounting sunglass on spectacles which consists of relatively simple parts which function together relatively for a long useful life.

It is another object of the present invention to provide a clip for mounting sunglasses on spectacles which utilizes a single simple "c" shaped spring to retain the parts together and provide the necessary biasing forces.

In accordance with the present invention, a clip is provided for mounting sunglass lenses on spectacles. The clip includes support means, lens carrying means movably mounted relative to the support means, spectacle clamping means movably mounted relative to the support means and substantially "c" shaped spring means. The spring means defines a recess into which the support means, the carrying means and the clamping means are at least partially received. The spring means retains the support means, carrying means and clamping means together and provides sufficient force to bias the clamping means towards the clamping position and the carrying means toward either an operative or inoperative position.

The spring means includes first and second edges. The clamping means includes first spring means edge retaining means. The carrying means includes second spring means edge retaining means. The first and second spring means edge retaining means respectively retain the first and second spring means edges and are situated, at least in part, within the spring means recess.

At least a portion of the support means is situated between the carrying means and the clamping means. The support means is preferably bifurcated.

The first spring means edge retaining means comprises a cylindrical member having an edge receiving recess and an axis. The carrying means is received in an arcuate recess in the support means and is moveable relative to the support means between the operative and inoperative positions. The first spring means edge exerts a force on the member directly along a line which is situated on one side of the axis, when the carrying means is in the operative position and on the other side of the axis, when the carrying means is in the inoperative position.

The second spring means edge retaining means includes a member having an end which is received in a recess in the support means and spring means edge receiving means spaced from the end. This member has a first portion including the spring means edge receiving recess. The recess is normally biased toward a position parallel to the support means by the spring means. The member also has an inclined portion which extend from the first portion and includes the end.

The clamping means includes first and second clamping legs and means for connecting the legs. The leg connecting means is parallel to and spaced from the first spring means edge retaining means.

To these and such other objects which may hereinafter appear, the present invention relates to a clip for mounting sunglass lenses on spectacles, as set forth in detail in the following specification, and recited in the annexed claims, taken together with the accompanying drawings, wherein like numerals, refer to like parts, and in which:

FIG. 5 is a side view, similar to that shown in FIG. 4, but showing the lens carrying means in the inoperative position.

As shown in the figures, the clip of the present invention comprises support means, generally designated A, sunglass lens carrying means, generally designated B, and spectacle clamping means, generally designated C. Support means A and lens carrying means B are each movably mounted relative to and on opposite sides of support means A, by a single simple "c" shaped spring, generally designated D.

Figure 1:
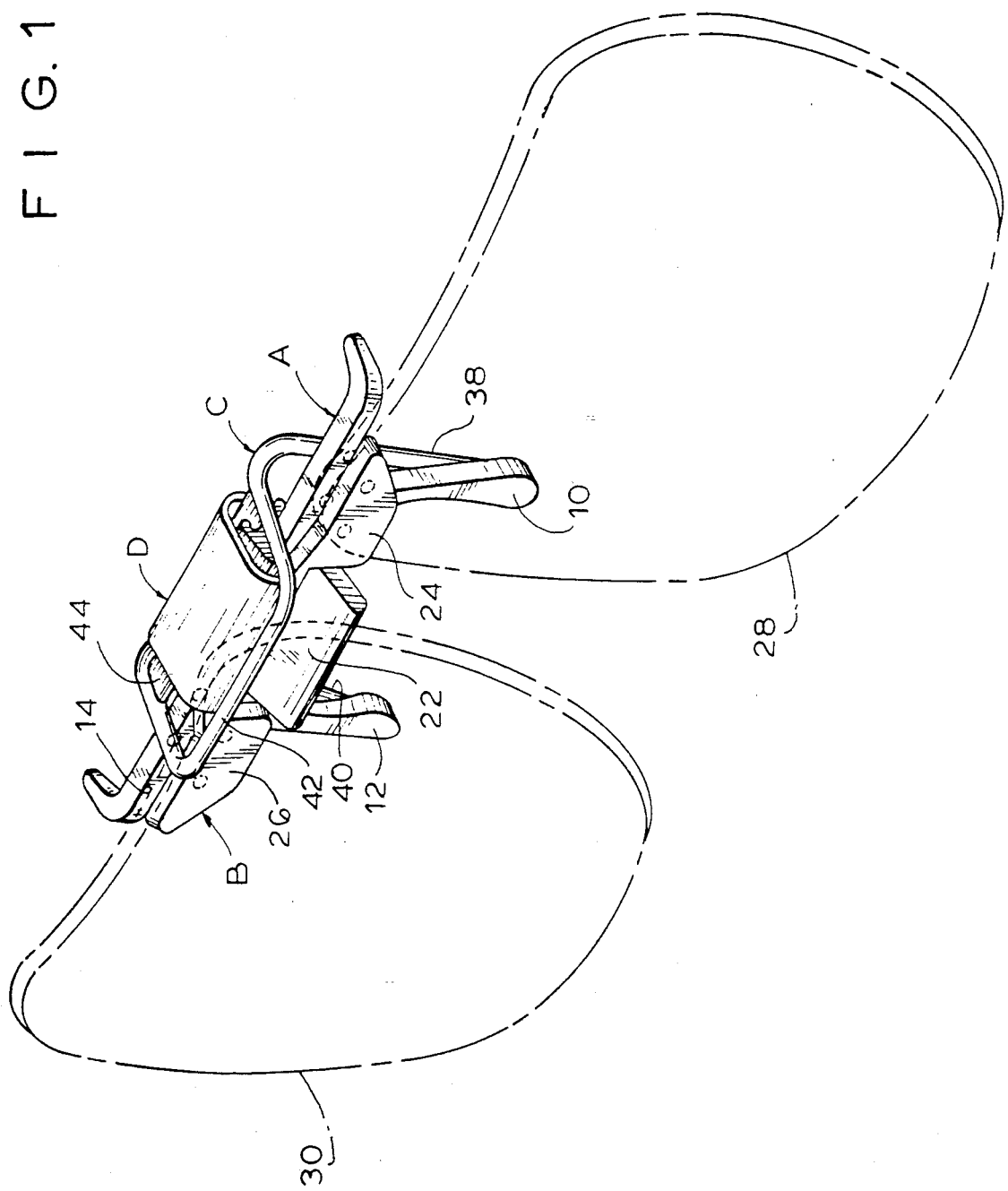
FIG. 1 is an isometric view of the clip of the present invention with sunglass lenses mounted thereon.
Figure 2:
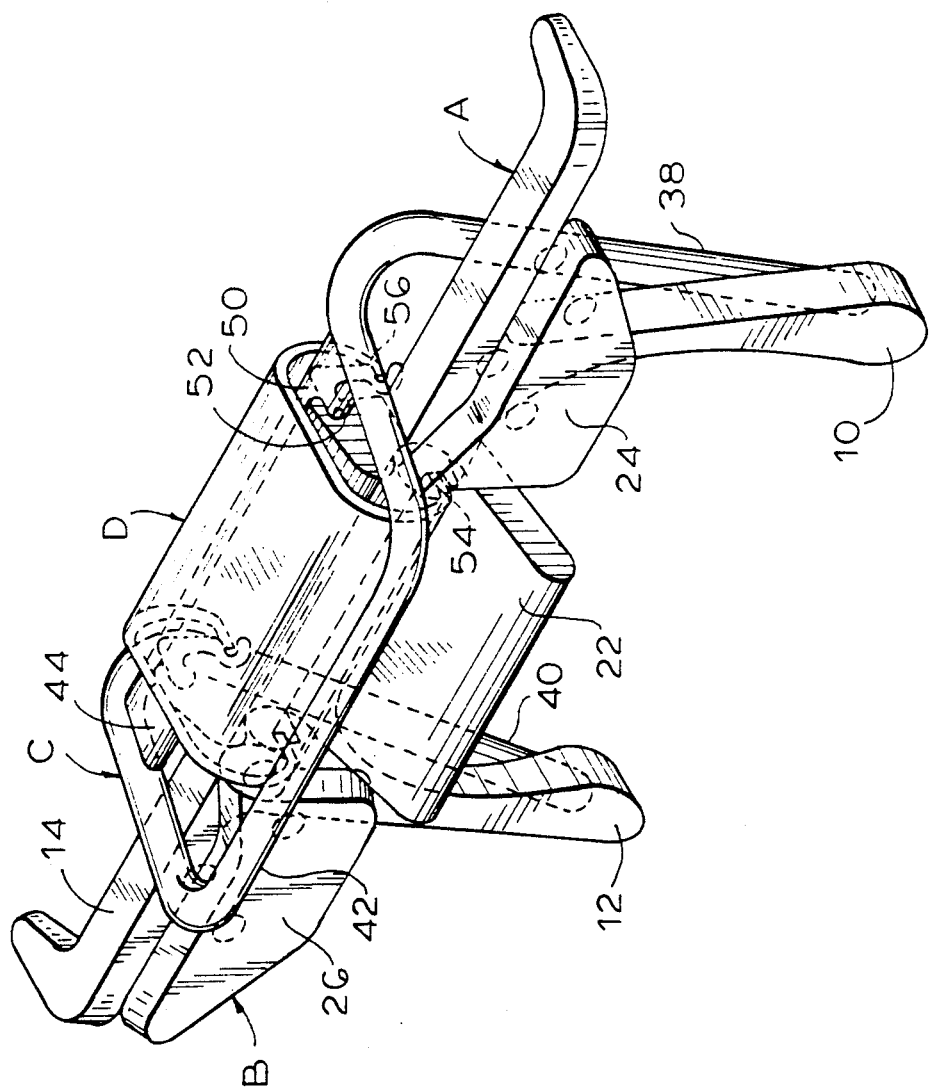
FIG. 2 is an enlarged view of the clip itself.
Figure 3:
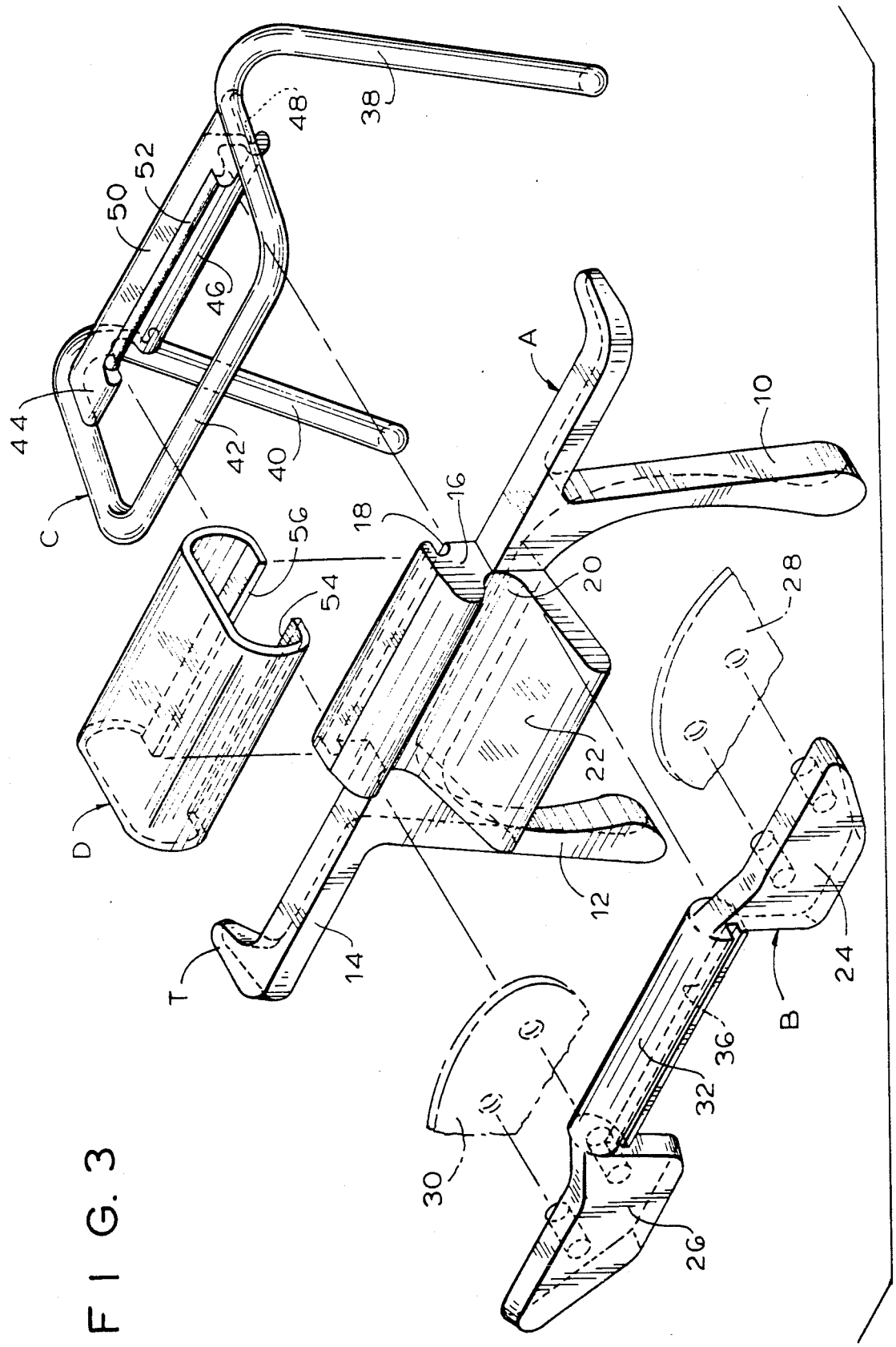
FIG. 3 is an exploded isometric view of the clip.

Support means A has a bifurcated portion including first and second spaced elongated elements 10, 12 situated to be positioned on either side of the nose of the wearer. Elements 10, 12 extend downwardly from a transverse element 14 which includes a central portion 16. Portion 16, as best seen in FIG. 3, includes a first recess 18 on one side and a second, substantially larger arcuate recess 20, on the other side. Recess 20 is partially defined by an element 22 which extends from portion 16.

Lens carrying mean B includes first and second elements 24, 26 to which lenses 28, 30 respectively affixed in any conventional fashion, such as adhesives, screws or pins. Means B includes a substantially cylindrical central member 32 situated between elements 24, 26. Member 32 has an axis 34 and an elongated peripheral recess 36 parallel to axis 34.

Figure 4:
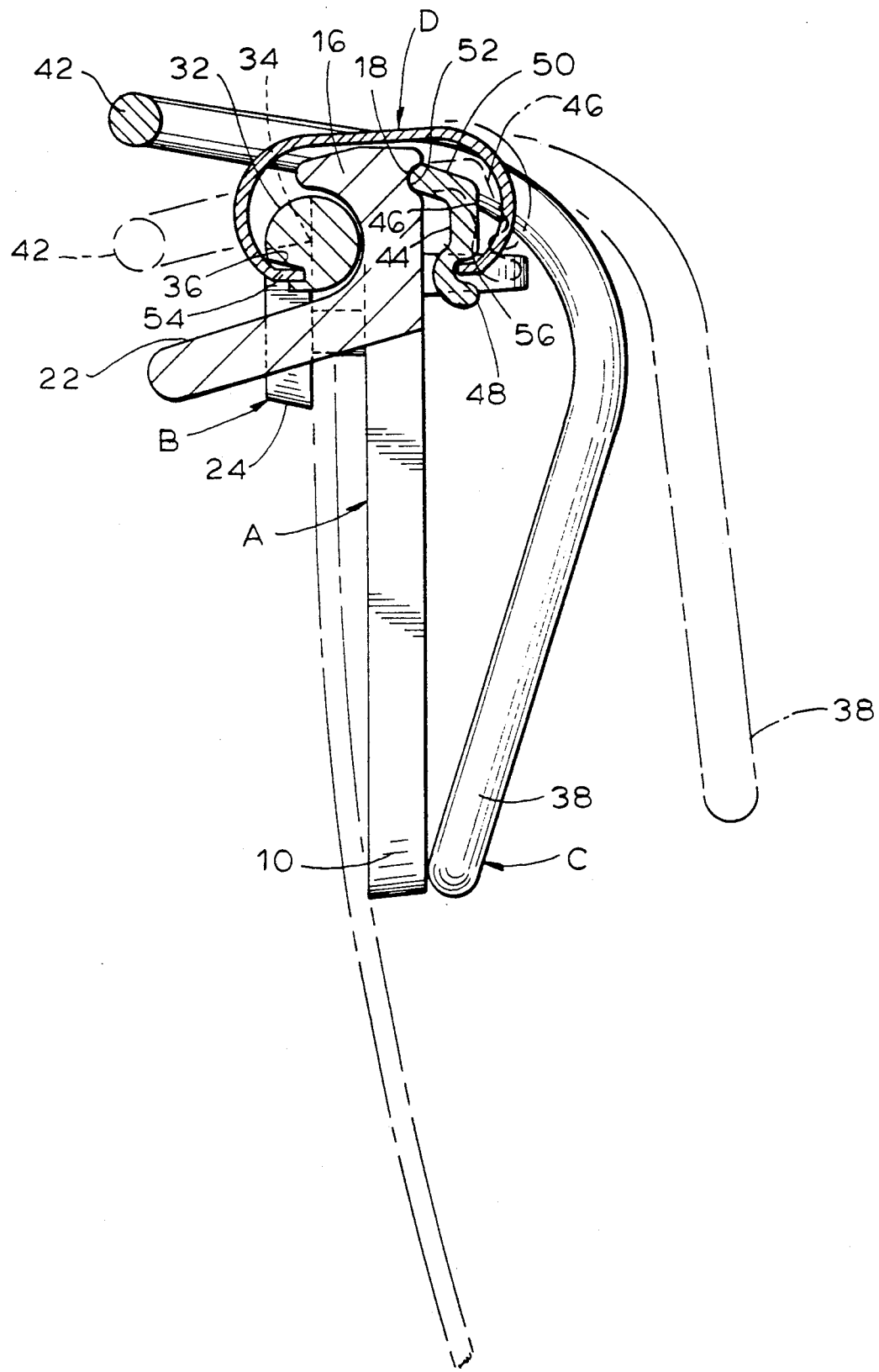
FIG. 4 is a side view of the clip showing the lens carrying means in the operative position.

Member 32 is received and retained within recess 20 in means A, such that it can rotate within recess 20 relative to means A to move means B between operative position, shown in FIG. 4, where lenses 28, 30 intersect the line of sight are parallel to the spectacle lenses and a inoperative position, shown in FIG. 5, where lenses 28, 30 are remote from the line of sight, approximately perpendicular to the spectacle lenses.

Clamping means C is a substantially "u" shaped part including downwardly curved legs 38, 40 which are connected together by portion 42. Legs 38, 40 align with and are biased towards elements 10, 12 of support means A respectively, so as to firmly clamp spectacles 39 therebetween.

Extending between legs 38 and 40, parallel to and spaced from portion 42, is a member 44. Member 44 includes a portion 46, which is normally parallel to support means A, and an elongated recess 48 proximate one end thereof. Extending from the other end of portion 46 is an inclined portion 50 with an end 52. End 52 is adapted to be rotatably received and retained within recess 18 of support means A.

Spring means D includes a first edge 54 and a second edge 56 and at least partially defines an interior, oval shaped, recess into which member 32 of means B, member 44 of means C and portion 16 of means A (including recesses 18 and 20) are adapted to be received. When these parts are assembled within the recess, edge 54 of spring means D is received in recess 36 of member 32 and edge 56 of spring means D is received in recess 48 of member 44. Spring means D serves to retain parts A, B and C together and at the same time provides all of the necessary biasing forces for clamping the spectacles and for maintaining the position of the sunglass lenses.

In particular, member 44 acts as a lever, pivotal about a fulcrum formed by end 52 in recess 18, so as to enhance the bias force of spring D urging legs 38, 40 towards elements 10, 12 of support means A. The spectacles are firmly clamp between legs 38, 40 and elements 10, 12 in this manner. Pushing downward on portion 42 of clamping means C causes the clamping means to rotate against the action of spring means D to move legs 38, 40 away from elements 10, 12 and permit the clip to be removed from the spectacles.

Spring means D also cooperates with member 32 to urge carrying means B towards either its stable positions. As seen in FIG. 4, in the operative position, edge 54 of spring means D exerts a force on member 32 directed towards support means A, along a line which falls below axis 34, tending to keep lens carrying member B in the "down" position. As seen in FIG. 5, in the operative position, edge 54 exerts a force on member 32 directed towards support means A, along a line which falls below axis 34, tending to keep carrying means B in the "up" position. Between those two positions the parts are unstable and, unless held against action of the spring means, will assume one or the other of the positions.

It will now be appreciated that the present invention comprises a clip for mounting sunglass lenses on spectacles which includes four simple parts, one of which is a "c" shaped spring which retains the other parts together and, at the same time, provides all the biasing forces needed for spectacle clamping and lens positioning.

While only a single embodiment of the present invention has been disclosed for purposes of illustration, it is obvious that many modifications and variations could be made thereto. It is intended to cover all of these modifications and variations which fall within the scope of the present invention, as defined by the following claims:

I claim:

1. A clip for mounting sunglass lenses on spectacles comprising support means, lens carrying means movably mounted relative to said support means, clamping means mounted for movement relative to said support means, between a clamping position proximate to said support means wherein the spectacles are clamped and a position remote from said support means and substantially "c" shaped spring means, said spring means at least partially defining a recess into which said support means, said lens carrying means and said clamping means are at least partially received, said spring means retaining said support means, said lens carrying means and said clamping means and providing sufficient force to bias said clamping means towards said clamping position and said lens carrying means toward either an operative or inoperative position.

2. The clip of claim 1 wherein spring means has first and second edges, said clamping means comprises first spring means edge retaining means, said carrying means comprising second spring means edge retaining means, said first spring means edge retaining means and said second spring means edge retaining means respectively retaining said first and second spring means edges and being situated, at least in part, within said spring means recess.

3. The clip of claim 2 wherein said first spring means edge retaining means comprises a substantially cylindrical member having an elongated edge receiving recess.

4. The clip of claim 3 wherein said support means comprises an arcuate recess adapted to receive said cylindrical member therein.

5. The clip of claim 3 wherein said carrying means is moveable relative to said support means between said operative and inoperative positions, wherein said member has an axis and wherein said first spring means edge exerts a force on said member directed along a line which is situated on one side of said axis, when said carrying means is in said operative position, and on the other side of the axis, when said carrying means is in said inoperative position.

6. The clip of claim 2 wherein said second spring means edge retaining means comprises a member having an end and a spring means edge receiving recess spaced from said end.

7. The clip of claim 6 wherein said support means comprises an elongated recess adapted receive said member end.

8. The clip of claim 6 wherein said member comprises a first portion normally biased towards a position substantially parallel to said support means, by said spring means, and an inclined portion extending from said first portion and comprising said end.

9. The clip of claim 8 wherein said first portion comprises said second spring means edge receiving recess.

10. The clip of claim 2 wherein said clamping means comprises first and second clamping legs and means connecting said legs.

11. The clip of claim 10 wherein said connecting means is substantially parallel to and spaced from said first spring means edge retaining means.

12. The clip of claim 1 wherein at least a portion of said support means is situated between said carrying means and said clamping means within said recess.

13. The clip of claim 1 wherein said support means is bifurcated.

14. A clip for mounting sunglass lenses on spectacles comprising support means, lens carrying means movably mounted relative to said support means, frame clamping means movably mounted relative to said support means, and substantially "c" shaped spring means, said spring means at least partially defining a recess into which said support means, said lens carrying means and said frame clamping means are at least partially received, said spring means retaining said support means, said lens carrying means and said frame clamping means and providing sufficient force to bias said clamping means towards a clamping position and said lens carrying means toward either an operative or inoperative position, said spring mean shaving first and second edges, said clamping means comprising first spring means edge retaining means, said carrying means comprising second spring means edge retaining means, said first spring means edge retaining means and said second spring means edge retaining means respectively retaining said first and second spring means edges and being situated, at least in part, within said spring means recess, said first spring means edge retaining means comprising a substantially cylindrical member having an elongated edge receiving recess.

15. The clip of claim 14 wherein said support means comprises an arcuate recess adapted to receive said cylindrical member therein.

16. A clip for mounting sunglass lenses on spectacles comprising support means, lens carrying means movably mounted relative to said support means, frame clamping means movably mounted relative to said support means, and substantially "c" shaped spring means, said spring means at least partially defining a recess into which said support means, said lens carrying means and said frame clamping means are at least partially received, said spring means retaining said support means, said lens carrying means and said frame clamping means and providing sufficient force to bias said clamping means towards a clamping position and said lens carrying means toward either an operative or inoperative position, said spring means has first and second edges, said clamping means comprises first spring means edge retaining means, said carrying means comprising second spring means edge retaining means, said first spring means edge retaining means and said second spring means edge retaining means respectively retaining said first and second spring means edges and being situated, at least in part, within said spring means recess, said second spring means edge retaining means comprising a member having an end and a spring means edge receiving recess spaced from said end.

17. The clip of claim 16 wherein said support means comprises an elongated recess adapted to receive said member end.

18. The clip of claim 16 wherein said member comprises a first portion normally biased towards a position substantially parallel to said support means, by said spring means, and an inclined portion extending from said first portion and comprising said end.

19. The clip of claim 18 wherein said first portion comprises said second spring means edge receiving recess.

20. A clip for mounting sunglass lenses on spectacles comprising support means, lens carrying means movably mounted relative to said support means, frame clamping means movably mounted relative to said support means, and substantially "c" clamped spring means, said spring means at least partially defining a recess into which said support means, said lens carrying means and said frame clamping means are at least partially received, said spring means retaining said support means, said lens carrying mans and said frame clamping means and providing sufficient force to bias said clamping means towards a clamping position and said lens carrying means toward either an operative or inoperative position, spring means having first and second edges, said clamping means comprising first spring means edge retaining means, said carrying means comprising second spring means edge retaining means, said first spring means edge retaining means and said second spring means edge retaining means respectively retaining said first and second spring means edges and being situated, at least in part, within said spring means recess, said first spring means edge retaining means comprising a substantially cylindrical member having an elongated edge receiving recess, said carrying means being movable relative to said support means between said operative and inoperative positions, wherein said member has an axis and wherein said first spring means edge exerts a force on said member directed along a line which is situated on one side of said axis, when said carrying means is in said operative position, and on the other side of the axis, when said carrying means is in said inoperative position.

* * * * *